United States Patent
Zillmer et al.

(10) Patent No.: US 6,626,798 B1
(45) Date of Patent: Sep. 30, 2003

(54) DEVICE AND METHOD FOR OPERATING AN INTERNAL COMBUSTION ENGINE PROVIDED WITH A BUTTERFLY VALVE IN OVERRUN MODE

(75) Inventors: Michael Zillmer, Sickte (DE); Ekkehard Pott, Gifhorn (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 10/070,148

(22) PCT Filed: Aug. 30, 2000

(86) PCT No.: PCT/EP00/08464
§ 371 (c)(1),
(2), (4) Date: Mar. 1, 2002

(87) PCT Pub. No.: WO01/20152
PCT Pub. Date: Mar. 22, 2001

(30) Foreign Application Priority Data

Sep. 14, 1999 (DE) .......................... 199 43 914

(51) Int. Cl.$^7$ .............................................. B60K 41/20
(52) U.S. Cl. .................. 477/183; 477/185; 477/203
(58) Field of Search ................ 477/183, 185, 477/203

(56) References Cited

U.S. PATENT DOCUMENTS

| | | | | |
|---|---|---|---|---|
| 3,835,825 A | * | 9/1974 | Baxendale et al. ......... | 123/325 |
| 4,237,830 A | | 12/1980 | Stivender .................... | 123/493 |
| 4,345,557 A | | 8/1982 | Ikeura ........................ | 477/111 |
| 4,391,246 A | | 7/1983 | Kawabata et al. .......... | 123/389 |
| 4,644,922 A | | 2/1987 | Glöckler et al. ............ | 123/682 |
| 4,700,673 A | | 10/1987 | Denz ........................... | 123/325 |
| 4,966,110 A | * | 10/1990 | Seki et al. ................... | 123/327 |
| 5,899,828 A | * | 5/1999 | Yamazaki et al. ............ | 477/4 |
| 5,902,210 A | | 5/1999 | Kobayashi et al. ......... | 477/118 |

FOREIGN PATENT DOCUMENTS

| | | | |
|---|---|---|---|
| DE | 30 20 494 C3 | 12/1980 | ................. 477/111 |
| DE | 33 23 723 | 1/1985 | ................. 123/682 |
| DE | 35 21 551 | 12/1986 | ................. 123/325 |
| DE | 43 34 210 | 4/1994 | |
| DE | 43 21 333 | 1/1995 | |
| DE | 43 32 445 | 3/1995 | |
| EP | 728 921 A2 | 8/1996 | |
| JP | 0580155257 | 9/1983 | |
| JP | 61178528 | 8/1986 | |
| JP | 3-213440 | 9/1991 | |

* cited by examiner

Primary Examiner—Sherry Estremsky
(74) Attorney, Agent, or Firm—Ostrolenk, Faber, Gerb & Soffen, LLP

(57) ABSTRACT

A method for operating an internal combustion engine of a motor vehicle with a butterfly valve, where the butterfly valve is opened and a fuel supply is cut off when the vehicle is in an overrun phase, the method including the steps of determining a first value of a position of the butterfly valve during the overrun phase as a function of a vehicle speed and an engine rpm value at a beginning of the overrun phase, adjusting the butterfly valve to the first value during the overrun phase; and adjusting the butterfly valve to a second value, which is calculated as a function of the vehicle speed and the engine rpm's, instead of to a value based on a gas pedal position for a certain predetermined time after an end of the overrun phase.

20 Claims, 1 Drawing Sheet

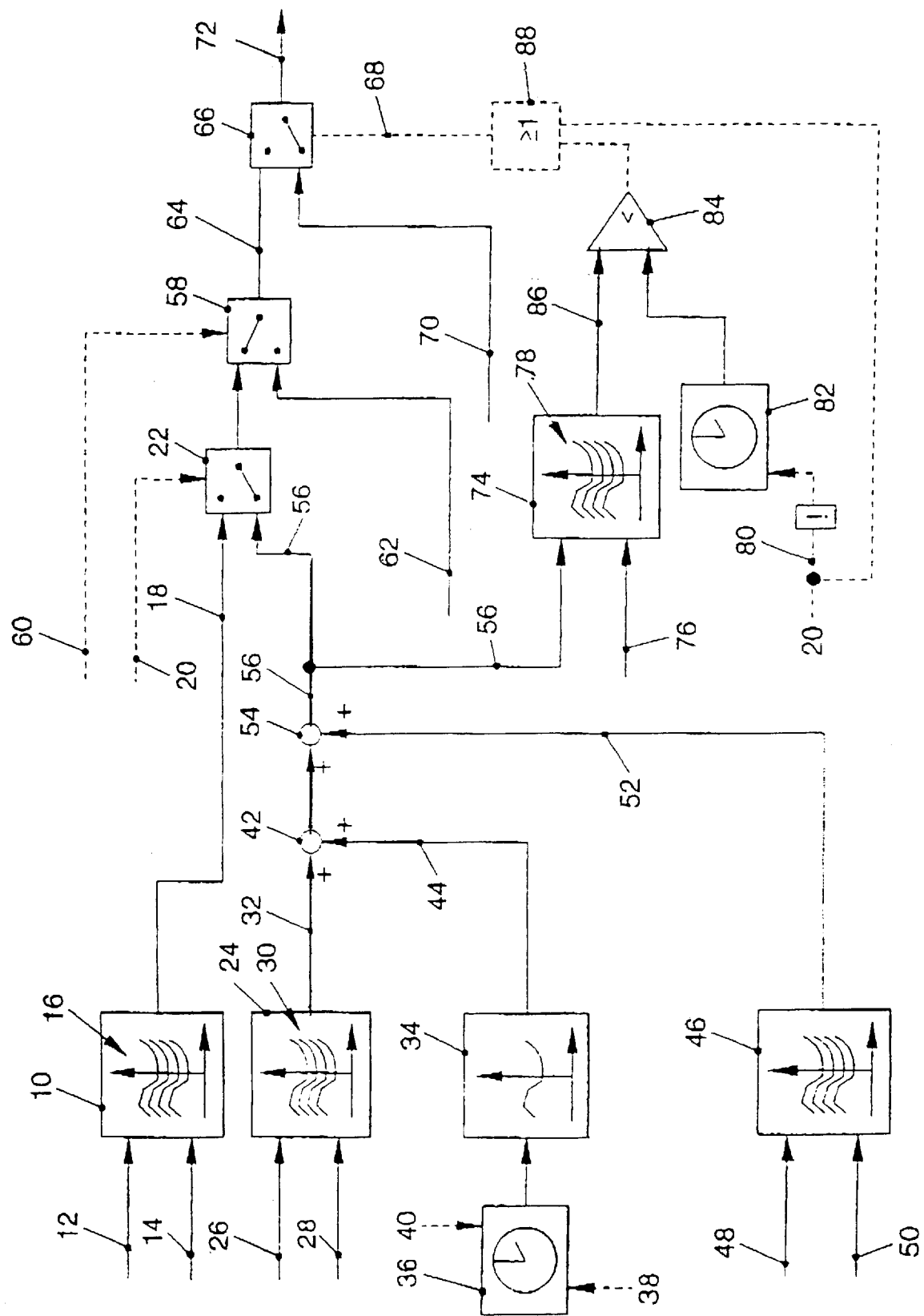

DEVICE AND METHOD FOR OPERATING AN INTERNAL COMBUSTION ENGINE PROVIDED WITH A BUTTERFLY VALVE IN OVERRUN MODE

PRIORITY CLAIM

This is a U.S. national stage of application No. PCT/EP00/08464, filed on Aug. 30, 2000. Priority is claimed on that application and on the following application:

Country: Germany, Application No: 199 43 914.1, filed on Sep. 14, 1999.

BACKGROUND OF THE INVENTION

The invention pertains to a method for operating an internal combustion engine of a motor vehicle with a butterfly valve, where the butterfly valve is opened and the fuel supply is cut off when the vehicle is in overrun mode. The invention also pertains to a system for actuating a butterfly valve of an internal combustion engine of a motor vehicle so that the butterfly valve can be adjusted to a value based on the position of the gas pedal.

In a motor vehicle with, for example, an $NO_x$ storage catalyst, the butterfly valve is opened completely and the fuel supply cut off during the times that the vehicle is in overrun mode. The purpose of this is to increase the rate of flow through the catalyst system and thus to support the cooling of the catalyst. The $NO_x$ storage catalyst is thus cooled more quickly to its working temperature. With this increased flow technique, three-way catalysts can also be cooled more effectively with large, nearly pollutant-free streams of exhaust gas. The heat exothermically released by the catalyst as a result of peak pollutant levels at the beginning of a fuel supply cutoff phase can be dissipated quickly by the following stream of cooling gas.

During the operation of the internal combustion engine of a motor vehicle with an opened butterfly valve in overrun mode, a small drag torque of the internal combustion engine can lead to a noticeable change in the driving behavior. In addition, when fired operation begins again, the driving behavior of the vehicle becomes uncomfortable and unpleasant for the driver and the passengers. When, for example, there is low load demand at the end of the overrun phase and the butterfly valve is actuated too late and/or too slowly, the decrease in the filling process will be delayed to a corresponding extent, and the motor vehicle will present the driver with unexpected responses, such as an increase in the power output of the internal combustion engine, even though the driver has not depressed the gas pedal with the goal of obtaining a significant increase in power but merely of ending the overrun phase and arriving in an operating state with a certain small amount of drive power.

SUMMARY OF THE INVENTION

The present invention is therefore based on the task of providing a system of the type indicated above which avoids the disadvantages indicated above and which makes available an overrun mode with an open butterfly valve which does not cause any changes in the driving behavior of the motor vehicle or any loss of driving comfort.

It is thus provided according to the invention in a method of the type indicated above that a first value for a position of the butterfly valve during the overrun phase is determined as a function of a motor vehicle speed and an engine rpm value at the beginning of the overrun phase, and that the butterfly valve is adjusted to this value during the overrun phase.

This offers the advantage that, no matter what the driving situation, a transition from overrun mode to fired mode with an open butterfly valve or from fired mode to overrun mode with an open butterfly valve will always occur without any noticeable change in the driving properties of the motor vehicle and with an appropriate drag moment during the overrun phase.

For an especially comfortable transition from overrun mode to fired mode, a second value for the position of the butterfly valve is determined during the overrun phase on the basis of the speed of the vehicle and the engine rpm's in such a way that this second value corresponds to the position of butterfly valve for uniform travel at the currently determined vehicle speed. The butterfly valve is adjusted to this second value at the end of the overrun phase.

An especially effective way of setting the butterfly valve to the most probable anticipated value, that is, an especially effective way of calculating a value for the position of the butterfly valve after the end of the overrun phase, is to determine the speed at which the driver's foot is repositioned from the brake pedal to the gas pedal, the second value of the position of the butterfly valve being corrected in accordance with this foot-repositioning speed. The second value for the position of the butterfly valve is preferably corrected on the basis of the foot-repositioning speed in such a way that, when the foot is repositioned quickly, the second value of the position for the butterfly valve is changed in the direction of higher power output from the internal combustion engine, and when the foot is repositioned slowly, the second value of the position of the butterfly valve is changed in the direction of lower power output from the internal combustion engine.

An even more accurate estimate of the probable load which will be demanded by the driver after the end of overrun mode can be obtained by determining the speed at which the gas pedal is actuated at the end of an overrun phase and by correcting the second value for the position of the butterfly valve in correspondence with the gas pedal actuation speed. The second value for the position of the butterfly valve is advisably corrected on the basis of the gas pedal actuation rate in such a way that, when the gas pedal is actuated quickly, the second value for the position of the butterfly valve is changed in the direction of higher power output from the internal combustion engine, and when the gas pedal is actuated slowly, the second value for the position of the butterfly valve is changed in the direction of lower power output from the internal combustion engine.

The two last-mentioned elaborations of the invention include the driver's behavior in the calculation of the probable future value for the position of the butterfly valve, which leads to an especially good estimate or calculation of this value.

To prevent the action of a brake booster from decreasing too quickly in overrun mode as a result of the open butterfly valve, a third, priority value for the position of the butterfly valve is adjusted when the brake booster signals that it requires assistance. This third value is selected so that sufficient negative pressure is available to assist the brake booster.

So that, within in a finite period of time after the end of overrun mode, the butterfly valve returns to the actual position based on the position of the gas pedal, the system switches the position of the butterfly valve from the calculated and possibly corrected second value back to the nominal value of the engine control system after a predetermined period of time. It is advisable for this predetermined time to be taken from, for example, a map of characteristic values on the basis of the second value for the position of the butterfly valve and the rpm value of the engine at the moment in question. Any difference which may occur during the predetermined time between the value for the position of the butterfly valve based on the gas pedal position and the calculated and possibly corrected second value for the position of the butterfly valve is compensated preferably by a change in the ignition angle.

In a system of the type described above, furthermore, a calculator for generating a calculated a value for the position of the butterfly valve is also provided, where the system adjusts the butterfly valve to the calculated value instead of to the value based on the position of the gas pedal for a predetermined time after the end of the overrun phase.

This offers the advantage that, no matter what the driving situation, a transition from overrun mode to fired mode with an open butterfly valve or from fired mode to overrun mode with an open butterfly valve will always occur without any noticeable change in the driving properties of the motor vehicle and with an appropriate drag moment during the overrun phase.

For an especially comfortable transition from fired mode to overrun mode, the system has a first device for determining a first calculated value for the position of the butterfly valve during overrun mode. This value can be taken, for example, from a map of characteristic values on the basis of the speed of the vehicle and the rpm's of the engine at the beginning of the overrun mode.

An especially effective way of adjusting the butterfly valve to the most probable anticipated value, that is, of calculating a value for the position of the butterfly valve after the end of overrun mode, is to provide the system with a second device for determining a second calculated value for the position of the butterfly valve after the end of overrun mode, which value can be taken, for example, from a map of characteristic values on the basis of the speed of the vehicle and the rpm's of the engine at the end of overrun mode.

A good-quality estimate of a most probable position of the butterfly valve to be expected after the end of overrun mode can be obtained by taking into account the behavior of the driver. The second device preferably comprises a sensor for determining the speed at which the driver repositions his foot from the brake pedal to the gas pedal. This second device then corrects the second calculated value of the position for the butterfly valve in correspondence with the foot-repositioning speed. For example, the second device corrects the second calculated value of the position of the butterfly valve on the basis of the foot-repositioning speed in such a way that, when the foot is repositioned quickly, the corrected second calculated value for the position of the butterfly valve corresponds to a value of higher power output from the internal combustion engine, whereas, when the foot is repositioned slowly, the second corrected value for the position of the butterfly valve corresponds to a value of lower power output from the internal combustion engine.

Alternatively or in addition to a sensor for detecting the foot-repositioning speed, the second device comprises a sensor for determining the speed at which the gas pedal is actuated and/or for determining an instantaneous speed of the vehicle. The second device then corrects the second calculated value of the position of the butterfly valve in correspondence with the gas pedal actuation speed or the vehicle speed by the use of a map of characteristic values. The second device corrects the second calculated value for the position of the butterfly valve on the basis of the gas pedal actuation speed, for example, in such a way that, when the gas pedal is actuated quickly, the corrected, second calculated value of the position of the butterfly valve corresponds to a value of higher power output from the internal combustion engine, and when the gas pedal is actuated slowly, the corrected second value for the position of the butterfly valve corresponds to a value of lower power output from the internal combustion engine.

To prevent the action of a brake booster from decreasing too quickly as a result of the open butterfly valve in overrun mode, the system has an input connected to a control unit for a brake booster, where the system sets a calculated priority value for the position of the butterfly valve when requested by the control unit of the brake booster in such a way that sufficient negative pressure is available for assisting the brake booster.

So that the position of the butterfly valve can return to the actual value based on the position of the gas pedal within a finite period of time after the end of overrun mode, the system has a time control unit, which switches the position of the butterfly valve from the calculated value to the value based on the gas pedal position after a predetermined amount of time has elapsed from the end of overrun mode. It is advisable for the time control unit to take the predetermined time from a map of characteristic values on the basis of the calculated value for the position of the butterfly valve and an instantaneous engine rpm value.

BRIEF DESCRIPTION OF THE DRAWING

Additional features, advantages, and advantageous embodiments of the invention can be derived from the following claims and from the following description of the invention, which is based of the attached drawing. The single FIGURE shows a schematic block diagram of the method according to the invention.

DETAILED DESCRIPTION OF THE PREFERRED EMBODIMENTS

In functional block 10, the instantaneous vehicle speed vfzg 12 at the beginning of overrun mode and the instantaneous engine rpm value nmot 14 of the internal combustion engine of the motor vehicle at the beginning of overrun mode are determined, and on the basis of these values, a first value 18 for the position of a butterfly valve of the internal combustion engine is taken from a map 16 of characteristic values. If a variable B_SA=true 20 indicates that the vehicle is in overrun mode, this first value 18 of the position of the butterfly valve is sent onward by functional block 22.

In another functional block 24, a second value 32 for the position of the butterfly valve is determined continuously and in parallel during overrun mode on the basis of the current vehicle speed vfzg 26 and the current engine rpm value nmot 28, this second value being taken from a map 30 of characteristic values. The second value 32 corresponds to a butterfly valve position during uniform travel at the currently determined speed 26 in the sense of highway driving at partial load.

In a third functional block 34, a stopwatch 36 is used to determine the time it takes for the foot to be repositioned from the brake pedal to the gas pedal. For this purpose, the stopwatch is initialized, i.e., started, for example, by means of a state "brake contact switch off" 38 and stopped by a power demand signal (PWR signal>0) 40. On the basis of this time difference, it is possible to predict what the driver is probably going to do. That is, if the repositioning time is short, it is very probable that the driver wants to have a considerable level of power at the end of the overrun phase; conversely, if the repositioning time is long, it is very probable that the driver wants only a modest amount of power at the end of the overrun phase. Accordingly, the second value 32 is corrected as needed in a collator or adder 42; that is, if the driver repositions his foot quickly from the brake pedal to the gas pedal, the second value 32 will be corrected to a value which corresponds to a butterfly valve position with a higher power demand, whereas if the driver repositions his foot slowly from the brake pedal to the gas pedal, the second value 32 is corrected to a value which corresponds to a butterfly valve position with a lower power demand. The size of the correction value 44 added on at 42 can also be a function of, for example, this foot-repositioning speed.

In a fourth functional block 46, yet another correction value 52 is determined on the basis of a gas pedal actuation speed dPWG/dt 48 and a current vehicle speed 50, which additional value ultimately changes the second value 32 to a corrected value 56 in a collator or adder 54. The basic principle of this correction is that, when the gas pedal is moving quickly at the beginning of the actuation process, a correspondingly high end value for the position of the gas pedal can be expected and vice versa. Accordingly, the second correction value 52 corrects the second value 32 in the direction of a butterfly valve position for a higher or lower power output from the internal combustion engine.

If the variable B_SA 20 in functional block 22 transmits the signal "false", for example, to indicate that the overrun phase is over, functional block 22 will no longer transmit the first value 18. Instead, it will transmit the corrected value 56 to functional block 58. This block in turn selects either the corrected second value 56 for the butterfly valve position or a third value 62 as a function of a variable B_BKVLEER 60. This third value 62 corresponds to a butterfly valve position at which a sufficient amount of negative pressure is ensured for assisting the brake booster. The variable B_BKVLEER 60 corresponds, for example, to the value "true" of a demand for more negative pressure by the brake booster. The starting value 64 of functional block 58 is transmitted to functional block 66, which, as a function of a signal 68, transmits either the starting value 64 of functional block 58 or a nominal value 70 for the butterfly valve position based on the gas pedal position as a nominal value 72 for the butterfly valve. Here, accordingly, the starting value 64 of functional block 58, after the end of overrun mode, corresponds to a probable value expected in the future, and the nominal value 70 based on the gas pedal position corresponds to the value of the butterfly valve position actually called for by the driver.

In a fifth functional block 74, a time period 86 is determined from the corrected second value 56 of the position of the butterfly valve and a current engine rpm value nmot 76 by the use of a map 78 of characteristic values. After the end of this time period, which comes after the end of the overrun phase, the calculated starting value 64 is switched back to the actual nominal value 70 based on the gas pedal position. At the end of the overrun phase, the variable B_SA 20 initializes a stopwatch 82 via line 80. In the functional block 84, the output of this stopwatch is compared with the time period 86 calculated in functional block 74. As long as this time period 86 is still running after the end of the overrun phase, the functional block 66 keeps transmitting the calculated starting value 64 for the butterfly valve position as the "nominal butterfly valve value" 72. As soon as the time period 86 is over, the functional block 88, which is under the control of the comparator 84 and the variables B_SA 20, uses the signal 68 to switch the functional block 66 so that the nominal value 70 for the butterfly valve position based on the gas pedal position is now transmitted as the "nominal butterfly valve position" 72. That is, a butterfly valve positioning device (not shown) is actuated again by the regular engine functions. If, within this time window 86 or within the first 1–20 work cycles thereafter, the actual torque deviates from the torque desired by the driver, this difference is compensated during an adjusting period of the butterfly valve by a change in the ignition angle, for example, as long as this does not cause the temperature of the catalyst to increase to the range in which thermal damage can occur.

What is claimed is:

1. A method for operating an internal combustion engine of a motor vehicle with a butterfly valve, where the butterfly valve is opened and a fuel supply is cut off when the vehicle is in an overrun phase, the method comprising the steps of: determining a first value of a position of the butterfly valve during the overrun phase as a function of a vehicle speed and an engine rpm value at a beginning of the overrun phase; adjusting the butterfly valve to the first value during the overrun phase; and adjusting the butterfly valve to a second value, which is calculated as a function of the vehicle speed and the engine rpm's, instead of to a value based on a gas pedal position for a certain predetermined time after an end of the overrun phase.

2. A method according to claim 1, including determining the second value, during the overrun phase, for the position of the butterfly valve so that the second value corresponds to a butterfly valve position for uniform travel at a currently determined speed of the vehicle.

3. A process according to claim 1, further including determining speed at which a driver's foot is repositioned from a brake pedal to the gas pedal at the end of the overrun phase, and correcting the second value of the position of the butterfly valve in correspondence with the foot-repositioning speed.

4. A method according to claim 3, including correcting the second value for the position of the butterfly valve based on the foot-repositioning speed so that, when the foot is repositioned quickly, the second value for the position of the butterfly valve is changed in a direction of higher power output from the internal combustion engine, and when the foot is repositioned slowly, the second value for the position of the butterfly valve is changed in a direction of lower power output from the internal combustion engine.

5. A method according to claim 1, further including determining a speed at which the gas pedal is actuated at the end of the overrun phase, and correcting the second value for the position of the butterfly valve in correspondence with the determined gas pedal actuation speed.

6. A method according to claim 5, including correcting the second value for the position of the butterfly valve based on gas pedal actuation speed so that, when the gas pedal is actuated quickly, the second value for the position of the butterfly valve is changed in a direction of higher power output from the internal combustion engine, and when the gas pedal is actuated slowly, the second value for the position of the butterfly valve is changed in a direction of lower power output from the internal combustion engine.

7. A method according to claim 1, further including adjusting the position of the butterfly valve to a third value with priority when a brake booster sends a signal that the brake booster requires assistance, the third value being selected so that a sufficient amount of negative pressure is present to assist the brake booster.

8. A method according to claim 1, including switching the position of the butterfly valve from the calculated second value back to a nominal value of an engine-speed control unit after a predetermined time has elapsed from the end of the overrun phase.

9. A method according to claim 8, including determining the predetermined time from the second value of the position for the butterfly valve together with an instantaneous engine rpm value.

10. A method according to claim 8, including compensating for a difference which occurs during the predetermined time between a value for the position of the butterfly valve based on the gas pedal position and the calculated second value for the position of the butterfly valve by a change in ignition angle.

11. A system for actuating a butterfly valve of an internal combustion engine of a motor vehicle so that the butterfly valve is adjusted to a value based on a position of a gas pedal, the system comprising: a calculator operative to generate a calculated value for a position of the butterfly valve as a function of a vehicle speed and an engine rpm value; and means for adjusting the butterfly valve to the calculated value instead of to the value based on the gas pedal position during an overrun phase and for a predetermined time after an end of the overrun phase.

12. A system according to claim 11, and further comprising first means for determining a first calculated value for the position of the butterfly valve during the overrun phase based on a vehicle speed and an engine rpm value at a beginning of the overrun phase, the first value being taken from a map of characteristic values in the first means.

13. A system according to claim 12, further comprising second means for determining a second calculated value for the position of the butterfly valve after the end of the overrun phase based on the vehicle speed and the engine rpm value at the end of the overrun mode, the second value being taken from a map of characteristic values in the second means.

14. A system according to claim 13, wherein the second means includes a sensor for determining a speed at which a driver's foot is repositioned from a brake pedal to the gas pedal, the second means being operative to correct the second calculated value for the position of the butterfly valve in correspondence with the speed at which the foot is repositioned.

15. A system according to claim 14, wherein the second means is operative to correct the second calculated value for the position of the butterfly valve based on the foot-repositioning speed so that, when the foot is repositioned quickly, the corrected second value for the position of the butterfly valve corresponds to a value of higher power output from the internal combustion engine, and, when the foot is repositioned slowly, the corrected second value for the position of the butterfly valve corresponds to a value of lower power output from the internal combustion engine.

16. A system according to claim 13, wherein the second means includes a sensor for determining a speed at which the gas pedal is actuated, the second means being operative to correct the second calculated value for the position of the butterfly valve in correspondence with at least one of the gas pedal actuation speed and a vehicle speed.

17. A system according to claim 16, herein the second means is operative to correct the second calculated value for the position of the butterfly valve based on the gas pedal actuation speed so that, when the gas pedal is actuated quickly, the corrected second calculated value for the position of the butterfly valve corresponds to a value of high power output from the internal combustion engine, and when the gas pedal is actuated slowly, the corrected second value of the position for the butterfly valve corresponds to a value of lower power output from the internal combustion engine.

18. A system according to claim 11, and further comprising an input connected to a control unit of a brake booster so that when the control unit of the brake booster demands, the system sets a calculated value for the position of the butterfly valve in such a way that a sufficient amount of negative pressure is available to assist the brake booster.

19. A system according to claim 11, and further comprising a timing unit operatively arranged so that after a predetermined amount of time has elapsed after the end of the overrun phase, the timing unit switches the position of the butterfly valve from the calculated value to the value based on the position of the gas pedal.

20. A system according to claim 19, wherein the timing unit is operative to determine the predetermined time based on the calculated value for the position of the butterfly valve and an instantaneous engine rpm value, the time value being taken from a map of characteristic values.

* * * * *